Jan. 11, 1966    T. F. PARKINSON ETAL    3,228,847
REACTOR CONTROL SYSTEM

Filed Jan. 29, 1963                          3 Sheets-Sheet 1

Jan. 11, 1966 T. F. PARKINSON ETAL 3,228,847
REACTOR CONTROL SYSTEM
Filed Jan. 29, 1963 3 Sheets-Sheet 2

Jan. 11, 1966 T. F. PARKINSON ETAL 3,228,847
REACTOR CONTROL SYSTEM
Filed Jan. 29, 1963 3 Sheets-Sheet 3

3,228,847
REACTOR CONTROL SYSTEM
Thomas Franklin Parkinson, 3930 SW. 5th Place, and George Ronald Dalton, 4055 NW. 12th Ave., both of Gainesville, Fla.; Donald James Blair, 500 Fon-du-Lac Drive, East Peoria, Ill., and Michael John Driscoll, M.I.T. Graduate House, 305 Memorial Drive, Cambridge 35, Mass.
Filed Jan. 29, 1963, Ser. No. 254,797
8 Claims. (Cl. 176—35)

The present invention relates to neutronic reactors and more particularly to systems for controlling the neutron flux in neutronic reactors.

In prior neutron flux control systems, solid control rods are inserted or withdrawn from the reactor core by rather complex electromechanical systems that are readily susceptible to mechanical failure.

Accordingly, an object of the present invention is to provide a non-mechanical neutron flux control system.

Still another object is to provide a fluid neutron flux control system.

Some prior neutronic reactors have fluid safety and also fluid shut-down systems that insert neutron absorbing material into the reactor core for terminating the reaction. However, these systems do not control neutron flux during normal operation.

Thus, a further object of the present invention is to provide a system for controlling neutron density within a neutronic reactor undergoing neutron fission chain reactions.

In reactor cores the axial neutron flux distribution usually is cosinusoidal with a peak flux near the midplane of the core. This variation of flux produces non-uniform power distribution and also non-uniform fuel consumption. Consequently, portions of the fuel rods near the midplane are often consumed almost entirely while considerable fuel remains in other portions of the rods. If the fuel rods could be consumed more uniformly, the time between major fuel changes could be considerably increased.

Hence, another object of this invention is to provide a neutron flux control system that produces substantially uniform power distribution and fuel rod consumption.

One of the economic factors to be considered in reactor design is the length of time the reactor can operate between major fuel changes. If this time can be lengthened, operating costs are reduced. Thus, it would be advantageous to be able to introduce new fuel periodically as the fuel in the core is consumed.

Hence, a further object is to provide a system for introducing fuel periodically without a major fuel change.

Still another object is to provide a neutron flux control system that is adapted for the introduction of fuel periodically without a major fuel change.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

Figure 1:
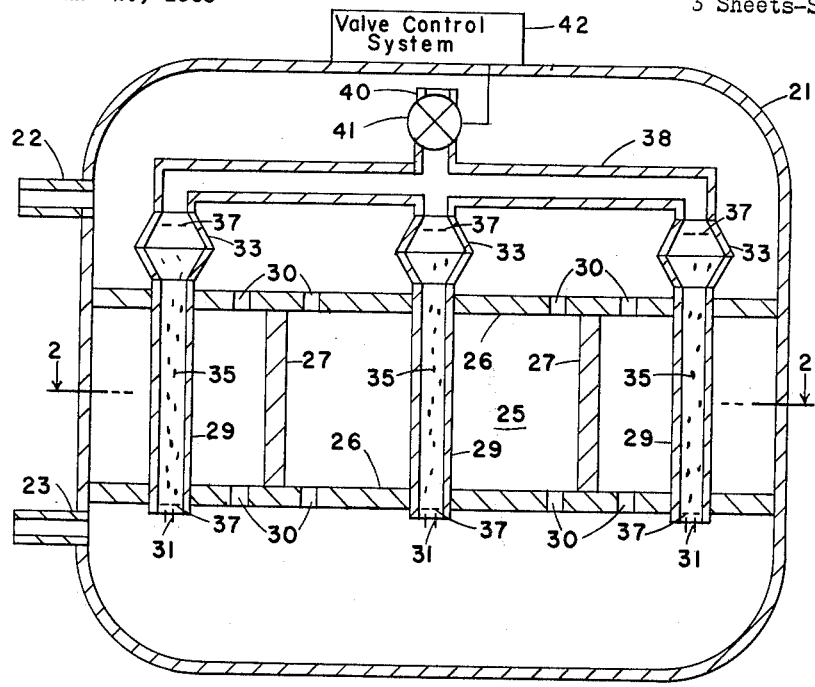
FIG. 1 is a vertical section through a neutronic reactor system utilizing a preferred embodiment of the present invention.

Referring to the figures in more detail, in FIG. 1 there is shown a cylindrical tank or container, preferably of steel, provided with a top port 22 and a bottom port 23 adapted to convey a coolant such as ordinary water, heavy water, or a gas such as $CO_2$. In normal operation a pumping system, not shown, forces the coolant through port 23 into container 21 and up through the active region of the reactor, generally indicated by 25, and out through port 22. This pumping system has not been illustrated since suitable pumping systems are well known in the nuclear reactor art, and the details of such pumping systems are not pertinent to the present invention.

In container 21 two spaced racks 26 support a plurality of fissionable rods 27 and neutron flux control assembly tubes 29 of a preferred embodiment of the present invention. Racks 26 have ports 30 for permitting coolant flow along rods 27.

In the bottom open ends of tubes 29, baffles 31 are preferably placed for diverting fluid into tubes 29 and also for eliminating turbulence of fluid flow within the tubes. At the upper ends of tubes 29, above the active region 25, are hoppers or plenums 33 positioned in line with tubes 29. The term plenum is employed hereinafter to indicate a container arrangement.

A plurality of particles 35, preferably containing some neutron absorbent material such as $B_4{}^{10}C$, are positioned in tubes 29 for movement under fluid forces. When the fluid flow is of sufficient velocity, it forces some or all of these particles out of active region 25 into the plenums 33. Retention screens 37 at the lower ends of tubes 29 and at the upper ends of plenums 33 prevent loss of particles 35 into the body of the reactor.

The upper ends of plenums 33 join to a header 38, the output from which connects to a pipe 40 in which a fluid control valve 41 is positioned. Valve 41 is of the type permitting varying control of fluid flow through pipe 40, and hence through the whole control tube assembly. The action of valve 41 is determined by a suitable electrical, mechanical, or other type control system 42. Since the details of suitable fluid valves and valve control systems are well known in the valve art and are not pertinent to the present invention, these details have not been illustrated.

Figure 2:
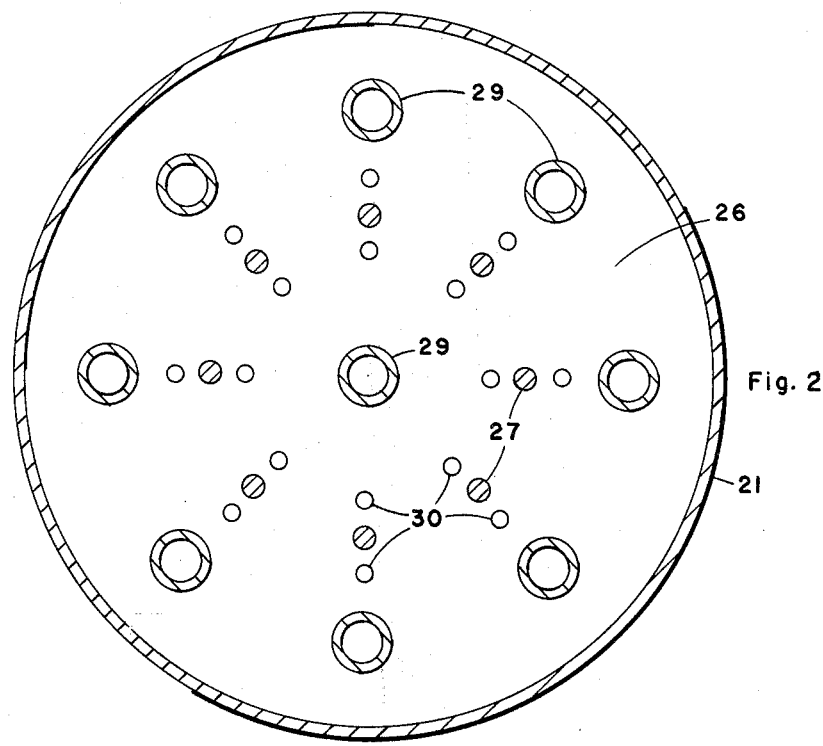
FIG. 2 is a horizontal sectional view taken in the plane indicated by the line 2—2 in FIG. 1.

The cross-sectional view of FIG. 2 illustrates one suitable arrangement of fuel rods 27 and tubes 29. However, the present invention can be employed with many other arrangements and is not restricted to any particular arrangement.

In operation of the embodiment illustrated in FIG. 1, baffles 37 in conjunction with the open ends of tubes 29 direct some coolant flow up into tubes 29. This flow produces upward forces, on particles 35, that are balanced, at least partially, by downward forces that include the force of gravity. When particles 35 are in positional equilibrium the upward forces are balanced entirely by the downward forces. If the fluid flow is of sufficient velocity, some or all of the particles 35 are forced up into plenums 33 where they are retained. The fluid flows up through tubes 29, through plenums 33 into header 38, out pipe 40, through valve 41 and back into the main body of container 21 and then out through port 22.

The density of the neutron absorbing particles 35 within the sections of tubes 29 extending into the active region 25 can be controlled through operation of valve 41. In this way the power output of the reactor is controlled. The greater the density of neutron absorbing particles 35 in active region 25 the lower the number of fissions and hence the less the power output.

During normal operation, valve 41 is partially closed to an extent such that the fluid forces some particles 35 into plenums 33 while some particles remain suspended in tubes 29 in active region 25. If more power output is desired, valve 41 is further opened by valve control system 42 to permit greater fluid flow in tubes 29 and hence greater upward forces on particles 35. More particles 35 are then forced into plenums 33, resulting in a decrease of particle density in active region 25. With less absorbing material in region 25, the neutron flux increases and greater power output is obtained.

When fluid velocity increases, only some of the particles 35 are usually forced into plenums 33. Other particles have increasing downward forces, determined by particle density, that cause them to remain suspended in region 25. Initially, immediately after fluid flow increases, the upward forces on many of the particles 35 exceeds the downward forces. These particles move upwards, and some of them move into plenums 33, thereby decreasing the particle density in region 25. As the density decreases, the downward forces on the remaining particles increases. Eventually, equilibrium is attained and the particles 35 remaining in tubes 29 are substantially suspended in the fluid therein.

If power decrease is desired, valve 41 is partially closed to decrease the rate of fluid flow in tubes 29. Immediately after the slowing of the fluid, the downward forces on many of the particles 35 in plenums 35 exceeds that of the upward forces. Thus, some of these particles drop into the sections of tubes 29 in region 25, increasing the particle density therein. Then, more neutrons are absorbed and power output is decreased. Some of the particles usually remain in plenums 33, for as the particle density increases, in tubes 29 the downward forces decrease until an equilibrium condition is attained.

When reactor shut-down is desired for safety or other reasons, valve 41 is closed sufficiently to cause all of the particles 35 in plenums to drop into region 25. In a preferred embodiment there are sufficient particles 35 to terminate reaction when all of them are within active region 25. With this arrangement it may not be necessary in some reactors to provide separate safety or shutdown systems.

In one suitable arrangement in which water was the coolant tubes 29 were 0.5 inch internal diameter and the particles were spherical copper shot of .71 millimeter diameter. Fluid flow over the range of .02 to .08 cubic foot per minute provided substantially uniform shot distribution of different densities. These dimensions are presented in way of an illustration and not a limitation, for the present invention has general applicability and is not limited to certain dimensions or materials.

Various other desirable operating conditions are within the realm of the present invention. For example, a coolant that is neutron absorbent can be used with particles that are not neutron absorbent. Then when particles 35 are in tube 29 in region 25 they displace some neutron absorbing fluid to cause a greater power output. With this arrangement the operation is the opposite of the opposite of that previously described. For an increase in power output, valve 41 is partially closed to cause some particles 35 to drop from plenums 33 into region 25. For a decrease in power output, valve 41 is open wider to permit a greater fluid flow. Then more of the particles are forced into plenums 33 and the neutron absorbing material in region 25 increases in volume. With this increase of neutron absorbing material, power output is decreased.

Figure 3:
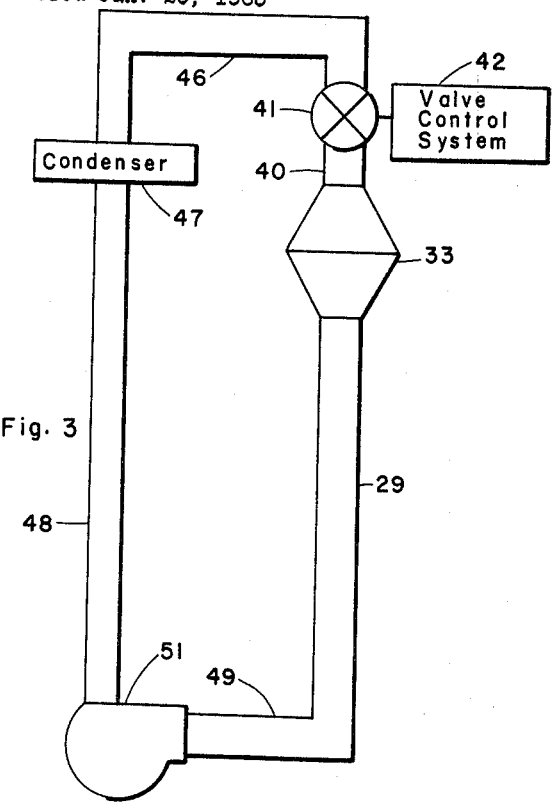
FIG. 3 is a schematic view of a moderator system with an embodiment of the present invention.

Some reactors do not have a coolant that is also the moderator. Instead, they employ separate moderator and coolant systems. The present invention is equally applicable to such reactors. FIG. 3 illustrates a control tube assembly of the present invention connected to a moderator fluid assembly. The control tube assembly is as previously described. The moderator system includes a pipe 46 for conveying fluid from pipe 40 of the control tube assembly to a condenser 47 which is a reservoir of the fluid used as the moderator. The fluid flows from condenser 47 through pipes 48 and 49 to the bottom open end of tube 29 of the control tube assembly, under the action of a fluid pump 51. The operation of this arrangement should be apparent from a prior explanation.

Figure 4:
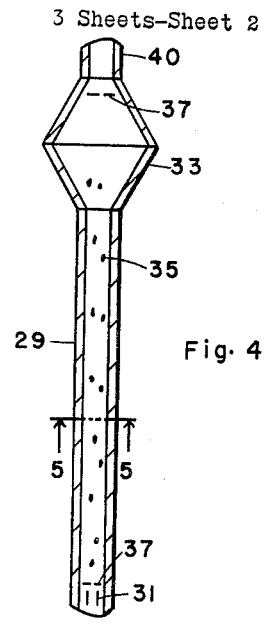
FIG. 4 is a vertical sectional view of a control tube assembly embodiment of the present invention.
Figure 5:
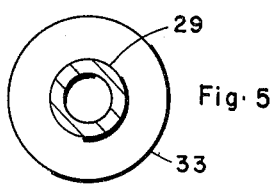
FIG. 5 is a horizontal sectional view taken in the plane indicated by the line 5—5 in FIG. 4.

Different tubes 29 may be desired for different reactor applications. One suitable tube 29 is illustrated in FIG. 4. It is of cylindrical configuration, as is best seen in the cross-sectional view of FIG. 5. With this type tube, which is relatively thick, incident neutrons are predominantly either absorbed or reflected.

Figure 6:
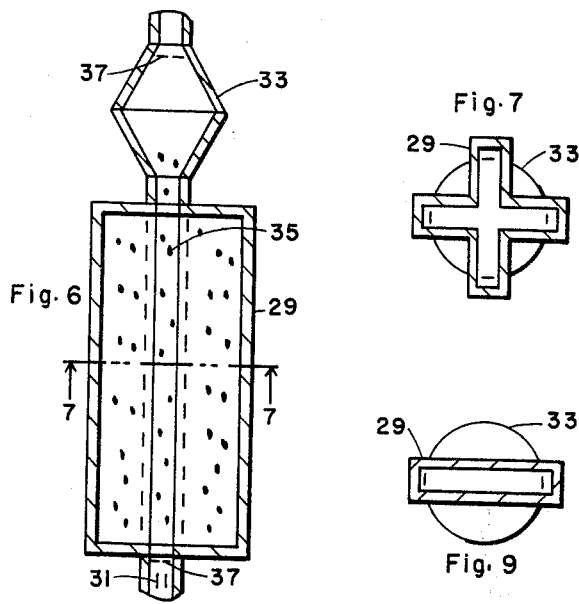
FIG. 6 is a vertical sectional view of another control tube assembly embodiment of the present invention.
Figure 7:
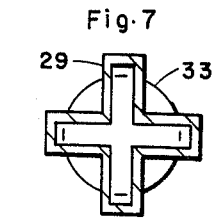
FIG. 7 is a horizontal sectional view taken in the plane indicated by the line 7—7 in FIG. 6.

In FIGS. 6 and 7 another tube embodiment is illustrated. This tube 29 has a cruciform configuration, as is evident from the cross-sectional view of FIG. 7. Neutrons incident upon this tube are predominantly either absorbed or transmitted, the transmission resulting from the thin nature of the tube.

Figure 9:
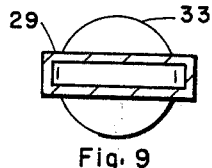
FIG. 9 is a horizontal sectional view taken in the plane indicated by the line 9—9 in FIG. 8.
Figure 8:
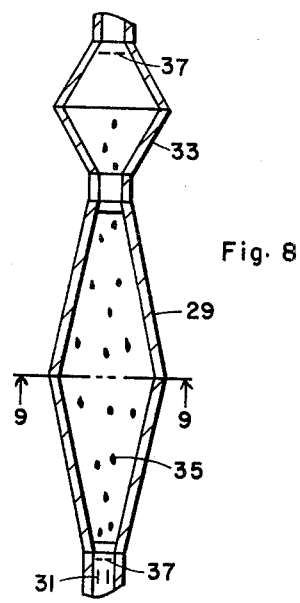
FIG. 8 is a vertical sectional view of still another control tube assembly embodiment of the present invention.

A preferred tube embodiment is illustrated in FIGS. 8 and 9. Two opposing sides of this tube 29 increase in separation towards the middle such that the tube cross-section is larger at the midportion than at the ends. This midportion preferably coincides with the midplane of active region 25. With this configuration, the number of neutrons absorbing particles in the midportion is greater than in other parts of the tube 29 even though the density of particles is uniform. This greater number of particles cause the flux in the midplane of region 25 to decrease more than in other regions. The result is a flattened axial flux distribution. As has been mentioned, the axial neutron flux distribution in prior reactors is cosinusoidal with the greatest flux occurring in the midplane of the active region 25. However, if the tube 29 of FIGS. 8 and 9 is used, this flux distribution is more constant. The flatter flux distribution produces more uniform consumption of fuel rods 27. Consequently, the periods between major fuel changes are extended.

Figures 10, 11, 13, 14:
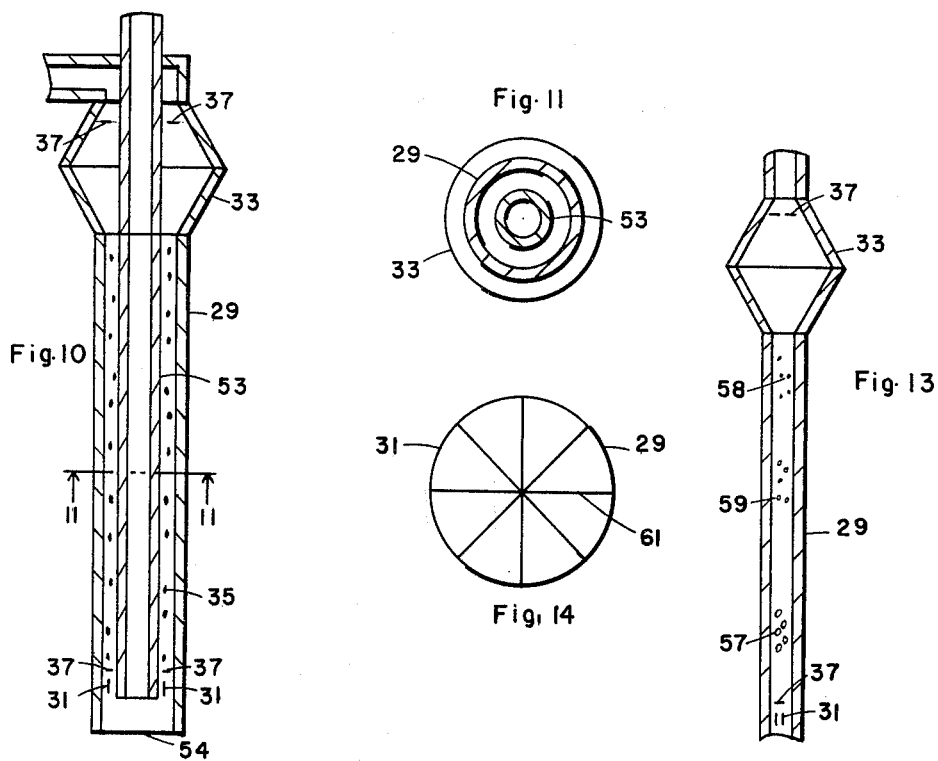
FIG. 10 is another control tube assembly embodiment of the present invention.
FIG. 11 is a horizontal sectional view taken in the plane indicated by the line 11—11 in FIG. 10.
FIG. 13 is a vertical sectional view of still another control tube embodiment.
FIG. 14 is a plan view of a suitable baffle for utilization in the present invention.

FIG. 10, and cross-sectional view of FIG. 11, illustrate another control tube assembly embodiment that is especially applicable for those reactor systems in which the moderator fluid system is separate from the coolant system. In this embodiment a tube 53 is placed within and spaced from tube 29. The bottom end 54 of tube 29 is closed. Tube 53 has an open end adjacent to, but spaced from the closed end 54. Particles 35 are positioned between tubes 53 and 29.

Figure 12:
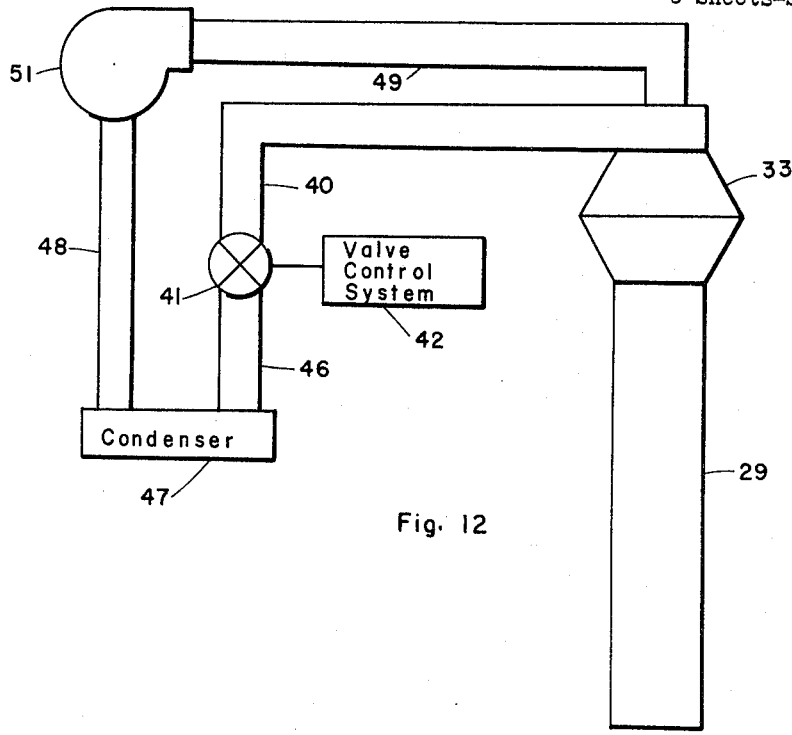
FIG. 12 is a schematic view of a moderator system with which the control tube embodiment of FIG. 10 is utilized.

In FIG. 12 the embodiment of FIGS. 10 and 11 is shown with a previously described fluid system. In the combined system, pump 51 forces fluid down through inner tube 53 and out and up between tubes 53 and 29 and out through pipe 40. The upward flow of fluid between tubes 29 and 35 produces the necessary upward forces on particles 35. Thus, the operation is quite similar to that of the FIG. 1 embodiment.

An explanation has been given for the desirability of greatest neutron absorption at the midplane of active region 25. With the arrangement illustrated in FIG. 13, such varied absorption or other type absorption is obtainable with uniform cross-sectional tubes 29. In this embodiment, the particles 35 are of several different sizes, here shown as 3. The particles, for example, may comprise stainless steel shot of 3 different radii, the shot being loaded with boron carbide ($B_4{}^{10}C$), which is a neutron absorbing material. Preferably, the middle-sized particles are loaded with the most neutron absorber. The amount of the absorber in all the smallest particles is preferably equal to that in all the larger particles. Under the action of the fluid stream, the largest particles, having the greatest mass, become suspended at 57 near the bottom of tube 29. The smallest particles are suspended at 58 near the top of tube 29. The medium sized particles move to equilibrium positions at 59 preferably midway between the largest and smallest particles. The middle sized particles, having the greatest amount of neutron absorbent, produce greatest absorption near the midplane of region 25. Only three groups of particles are illustrated in order to simplify the illustration and explanation. However, in practice many different-sized particles normally will be employed so that particles are suspended all along the length of tube 29. The particles are selectively loaded with neutron absorbent such that the variation of neutron absorption material along the axial direction flattens the axial flux distribution.

In FIG. 14 is shown a plan view of one suitable type of baffle that may be employed. It comprises a plurality of radially-arranged blades 61 that serve to linearize the fluid flow in tube 29. Obviously, other baffle arrangements are also suitable.

In another embodiment, to which the illustrated figures are applicable, the particles 35 are at least partially comprised of fuel. This fuel is in addition to that of fuel rods 27. As the fuel in particle form is consumed, it can be much more readily replaced than the fission rods 27. Thus, while rods 27 provide the major portion of the fuel, the periodic insertion of fuel particles 35 effectively increases the life of rods 27. Alternatively, fuel rods 27 may be replaced by tubes 29 containing fuel alone. In this arrangement some tubes 29 contain only fuel particles and others only neutron absorbing particles.

While the invention has been described with respect to certain specific embodiments, it will be appreciated that many modifications and changes may be made by those skilled in the art without departing from the spirit of the invention. We intend, therefore, by the appended claims, to cover all such modifications and changes as fall within the true spirit and scope of the invention.

What we claim as new and desire to secure by Letters Patent of the United States is:

1. In a neutronic reactor having an active portion adapted to maintain a self-sustaining neutronic reaction, the combination comprising a control tube extending into the active portion, fluid-movable neutronic reacting particles arranged in said tube, the mean diameters of said particles being of the order of less than one tenth of the mean diameter of said tube, and means for producing a flow of fluid through said tube at such rates whereby said particles can be suspended along the length of said tube in substantially non-contacting fashion, and whereby an almost continual variation in the density of said particles can be obtained along the length of said tube in the active portion.

2. The combination as defined in claim 1 wherein said particles are constructed of neutron absorbent material.

3. The combination as defined in claim 1 wherein said tube is of cylindrical configuration.

4. The combination as defined in claim 1 wherein said tube is of cruciform configuration.

5. The combination as defined in claim 1 wherein said tube has an enlarged cross-section in the midportion of the tube extending into the active region, whereby peak-to-average power ratio is minimized.

6. The combination as defined in claim 1 wherein said means for producing fluid flow comprises a baffle at one end of said tube for directing fluid flow into said tube.

7. In a neutronic reactor having an active portion adapted to maintain a self-sustaining neutronic reaction and also having a system for moving fluid through the active portion, the combination comprising a control tube extending into the active portion, fluid-movable neutronic reacting particles arranged in said tube, the mean cross-sectional area of each of said particles being less than one one-hundredths of the mean cross-sectional area of said tube, and means for producing a flow of fluid through said tube at such rates whereby said particles are suspended in fluidized fashion such that the per volume particle density along the length of said tube can be continuously varied through the variation of the fluid flow rate.

8. In a neutronic reactor having an active region adapted to maintain a self-sustaining neutronic reaction and having a system for movement of fluid through the active region, a control tube assembly for controlling neutronic flux, said assembly comprising an inner tube extending from a non-active region of the reactor into the active region, an outer tube surrounding said inner tube and spaced therefrom, said outer tube having a closed end, said inner tube having an open end adjacent to and spaced from said closed end of said outer tube, means for providing fluid flow between said tubes, and neutron absorbing particles positioned between said inner tube and said outer tube for movement along said tubes under the force of fluid flow, the mean diameter of said particles being of the order of less than one tenth the distance of separation between said tubes.

References Cited by the Examiner

FOREIGN PATENTS

37/4,096  6/1962  Japan.

OTHER REFERENCES

Kumpf (Germany), German application 1,052,000, printed March 5, 1959.

LEON D. ROSDOL, *Primary Examiner.*

REUBEN EPSTEIN, CARL D. QUARFORTH,
*Examiners.*

M. R. DINNIN, *Assistant Examiner.*